US006941805B2

(12) United States Patent
Seidel et al.

(10) Patent No.: US 6,941,805 B2
(45) Date of Patent: Sep. 13, 2005

(54) MULTI-FUNCTION AIR DATA SENSING PROBE HAVING AN ANGLE OF ATTACK VANE

(75) Inventors: Greg A. Seidel, Farmington, MN (US); Dennis J. Cronin, Apple Valley, MN (US); John H. Mette, Faribault, MN (US); Mark R. Koosmann, Corcoran, MN (US); James A. Schmitz, Eagan, MN (US); John R. Fedele, Burnsville, MN (US); Dana A. Kromer, Minnetonka, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 0 days.

(21) Appl. No.: 10/606,929

(22) Filed: Jun. 26, 2003

(65) Prior Publication Data

US 2004/0261518 A1 Dec. 30, 2004

(51) Int. Cl.[7] .................................... G01P 13/00
(52) U.S. Cl. ..................... 73/170.02; 73/180; 73/182
(58) Field of Search ......................... 73/170.02, 180, 73/182

(56) References Cited

U.S. PATENT DOCUMENTS

| | | | | | |
|---|---|---|---|---|---|
| 2,850,896 | A | | 9/1958 | Se Legue et al. | 73/188 |
| 3,665,760 | A | | 5/1972 | Pitches et al. | 73/188 |
| 3,882,721 | A | | 5/1975 | Neary et al. | 73/188 |
| 4,458,137 | A | * | 7/1984 | Kirkpatrick | 219/201 |
| 4,672,846 | A | * | 6/1987 | LeBlond et al. | 73/180 |
| 5,025,661 | A | * | 6/1991 | McCormack | 73/180 |
| 5,319,970 | A | * | 6/1994 | Peterson et al. | 73/182 |
| 5,423,209 | A | | 6/1995 | Nakaya et al. | 73/182 |
| 5,466,067 | A | | 11/1995 | Hagen et al. | 374/138 |
| 5,601,254 | A | * | 2/1997 | Ortiz et al. | 244/1 R |
| 5,616,861 | A | * | 4/1997 | Hagen | 73/180 |
| 5,628,565 | A | * | 5/1997 | Hagen et al. | 374/143 |
| 5,653,538 | A | * | 8/1997 | Phillips | 374/138 |
| 5,731,507 | A | | 3/1998 | Hagen et al. | 73/182 |
| 6,134,972 | A | * | 10/2000 | Streckert et al. | 73/861.65 |
| 6,370,450 | B1 | * | 4/2002 | Kromer et al. | 701/14 |

(Continued)

FOREIGN PATENT DOCUMENTS

| | | |
|---|---|---|
| WO | WO 99/61924 | 12/1999 |
| WO | WO 01/44821 A1 | 6/2001 |
| WO | WO 01/67115 A2 | 9/2001 |
| WO | WO 01/77622 A2 | 10/2001 |

OTHER PUBLICATIONS

BFGoodrich Aircraft Sensors—Model 0861CAL Angle of Attack Sensor, published Dec. 1998 (2 pages).
BFGoodrich Aircraft Sensors—Model 0861HD Angle of Attack Sensor, published Dec. 1998 (2 pages).
BFGoodrich Aerospace Brochure—Angle of Attack Systems, published Apr. 1995, Rev. Apr. 1995 (8 pages).

*Primary Examiner*—Edward Lefkowitz
*Assistant Examiner*—Andre Allen
(74) *Attorney, Agent, or Firm*—Westman, Champlin & Kelly, P.A.

(57) ABSTRACT

A multi-function air data sensing probe has a strut that is mounted on an aircraft and extends laterally from the aircraft skin. The strut is supported on a base plate, and has a pitot pressure sensing tube at the outer end thereof, with a pitot port facing upstream, and also includes a passageway for total air temperature sensor including a forwardly facing inlet scoop that leads to a chamber in the strut that is laterally offset from the inlet scoop so that flow changes direction as it enters the chamber. The surface defining the change of direction between the scoop and the chamber is provided with bleed holes for bleeding off boundary layer air. A vane type air data sensor is mounted on a shaft that rotates freely and is supported on the strut, and is positioned to sense the relative air flow past the strut to determine changes of relative angles of such air flow. In addition, the strut has static pressure sensing ports on lateral sides thereof leading to a separate chamber on the interior of the strut.

16 Claims, 6 Drawing Sheets

U.S. PATENT DOCUMENTS

| | | | | |
|---|---|---|---|---|
| 6,419,186 B1 | | 7/2002 | Bachinski et al. | 244/17.11 |
| 6,452,542 B1 | * | 9/2002 | Bachinski et al. | 342/357.06 |
| 6,490,510 B1 | * | 12/2002 | Choisnet | 701/14 |
| 6,543,298 B2 | | 4/2003 | Cronin et al. | 73/861.65 |
| 6,609,421 B2 | * | 8/2003 | Cronin et al. | 73/170.02 |
| 6,612,166 B2 | | 9/2003 | Golly et al. | 73/170.02 |
| 6,817,240 B2 | | 11/2004 | Collot et al. | 73/170.02 |
| 2003/0051546 A1 | | 3/2003 | Collot et al. | 73/170.02 |

* cited by examiner

MULTI-FUNCTION AIR DATA SENSING PROBE HAVING AN ANGLE OF ATTACK VANE

BACKGROUND OF THE INVENTION

The present invention relates to a multi-function probe for mounting on air vehicles which incorporates a plurality of air data sensors in one probe body, including a vane type angle of attack sensor to reduce the number of projecting struts and probes from an air vehicle surface, thereby saving weight, and reducing drag.

In the past, multi-function probes that sense pressure parameters comprising static pressure, pitot pressure, and total temperature, have been advanced. These probes also included ports that were located so that angle of attack could be determined due to pressure differentials at the selected ports.

U.S. Pat. No. 5,731,507 discloses an air data sensing probe that senses pitot pressure, and static pressure, and include a total temperature sensor. The probe disclosed in this patent also has angle of attack pressure sensing ports that are located on a common plane on opposite sides of the probe. Angle of attack is determined by pressure differentials at such ports.

Angle of attack sensors that have a vane mounted to pivot on a cylindrical probe about an axis generally perpendicular to the central axis of the probe are known. For example, U.S. Pat. No. 3,882,721 illustrates such a vane type sensor mounted directly to the skin of an air vehicle.

A total air temperature measurement probe using digital compensation circuitry is disclosed in U.S. Pat. No. 6,543,298, the disclosure of which is incorporated by reference.

SUMMARY OF THE INVENTION

The present invention relates to an air data sensing probe assembly that includes a plurality of air data sensors integrated into a single, line replaceable probe unit. The probe has a low drag strut or support housing supported on an air vehicle surface and projecting laterally into the air stream. The strut supports a pitot pressure sensing tube or head, a total air temperature sensor with associated ducting in the strut, as well as static pressure sensing ports on the side surfaces of the probe. The strut further mounts a rotatable vane angle of attack sensor. Thus, pitot pressure ($P_t$), static pressure ($P_s$), total air temperature (TAT), and angle of attack (AOA) are all measured in a single unit.

The probe assembly provides the benefits of a vane type angle of attack sensor, but does not require calculations based on sensed differential pressures, although, as disclosed, sensed differential pressures are available for redundancy. A rugged probe that will accurately sense pressures and also provide accurate and reliable angle of attack indications is provided.

The sensors are arranged so there is little interference with the inlet scoop for the total temperature sensor passageways. Additionally, an air data computer is mounted directly to the mounting plate for the air data sensor probe assembly so that all sensors, signal conditioning circuits, and all calculations along with the necessary readout signals can be provided from a single package that can be easily removed and replaced for service. In other words, the multi-function probe is a smart probe that provides all needed air data information for high performance aircraft.

On-board processors also can be used for the calculations, if desired.

DETAILED DESCRIPTION OF THE PREFERRED EMBODIMENTS

Figure 4:
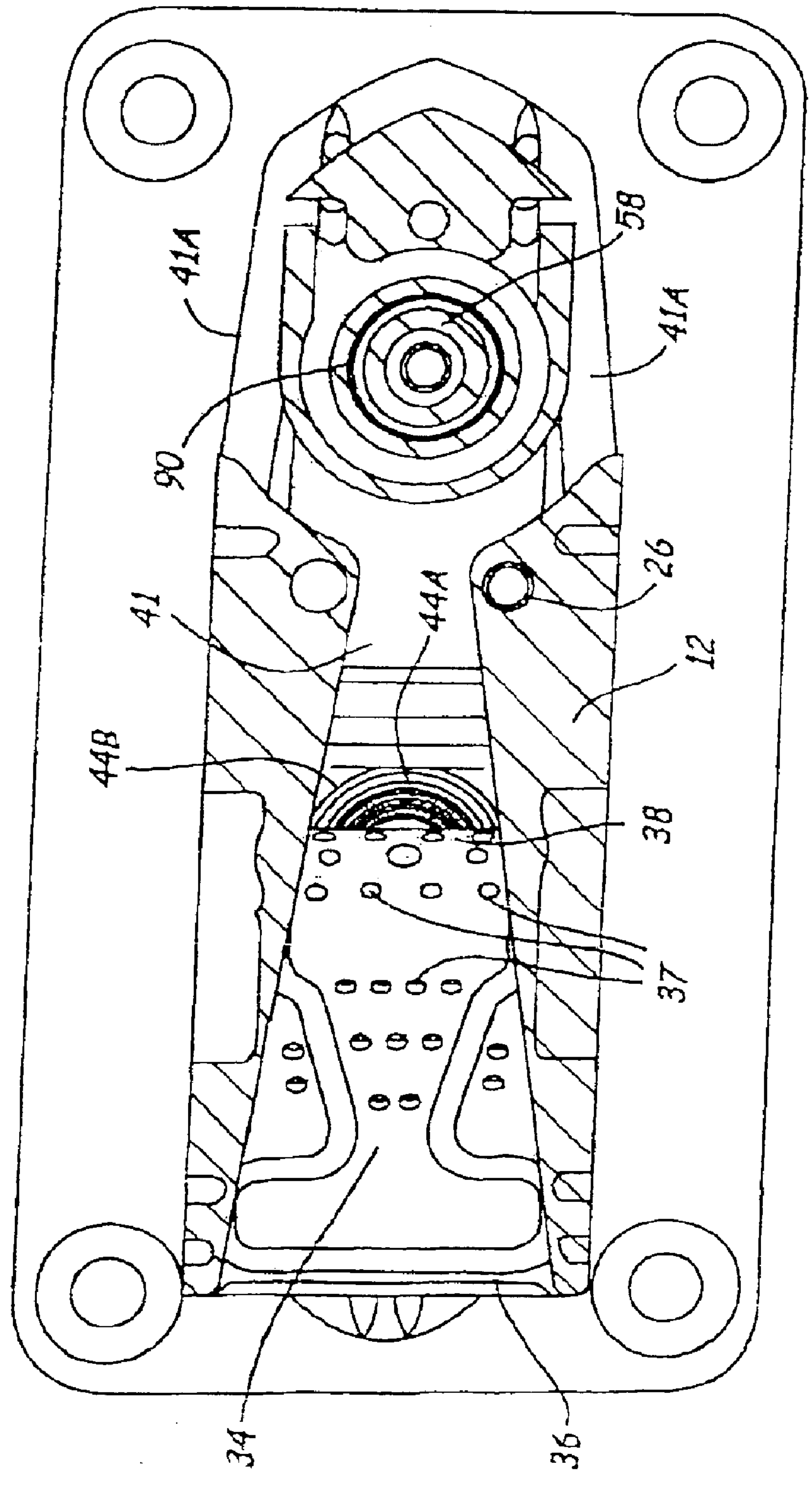
FIG. 4 is a sectional view taken on line 4—4 in FIG. 2.
Figure 5:
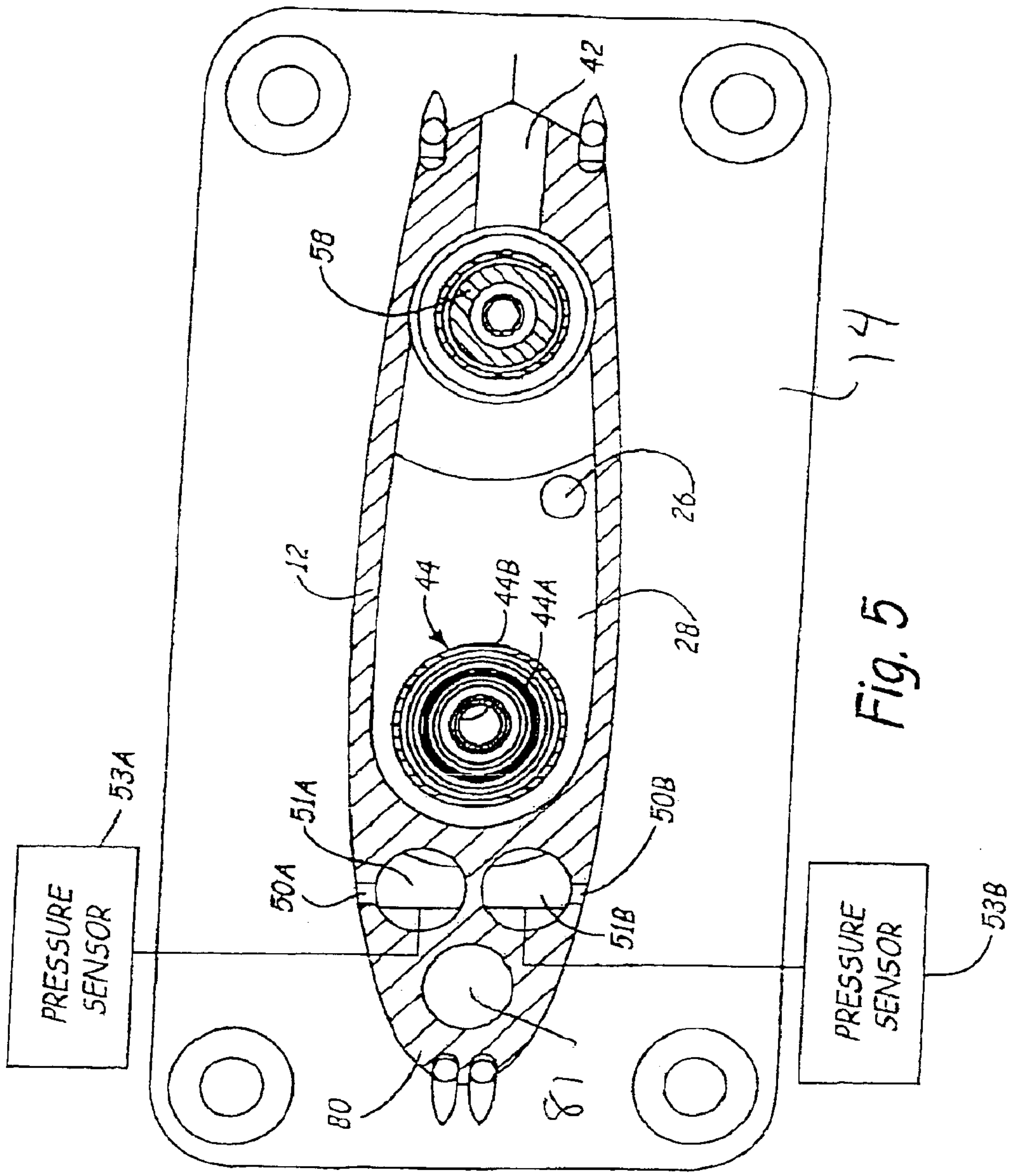
FIG. 5 is a sectional view taken on line 5—5 in FIG. 2.
Figure 6:
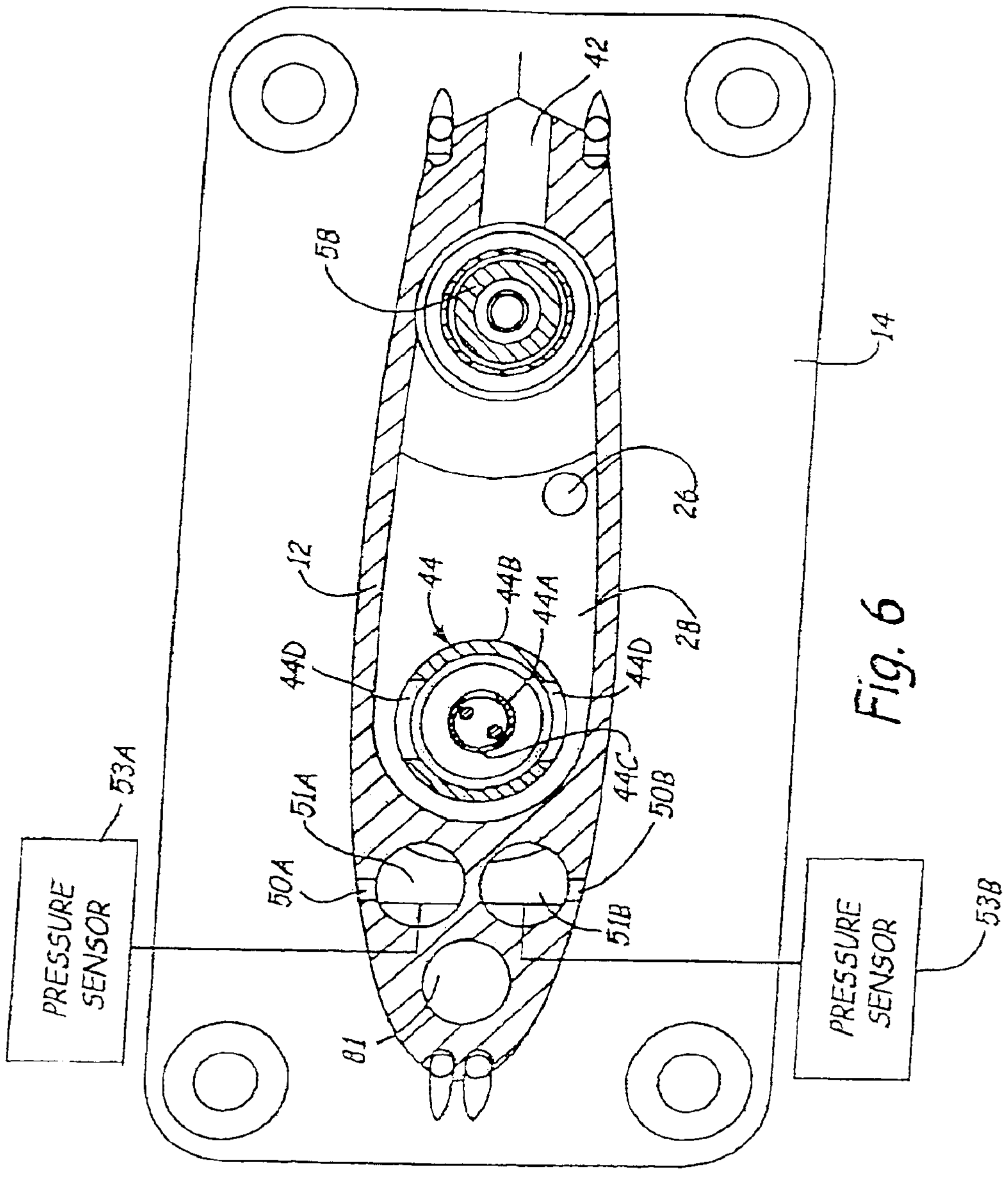
FIG. 6 is a sectional view taken as on line 6—6 in FIG. 2.

A multi-function probe assembly indicated generally at 10 includes a strut 12 that is generally airfoil shaped in cross section as shown in FIGS. 4–6. The strut 12 is supported on a mounting plate 14. The mounting plate 14 in turn is adapted to be mounted in place on the skin of an aircraft 16.

Figure 2:
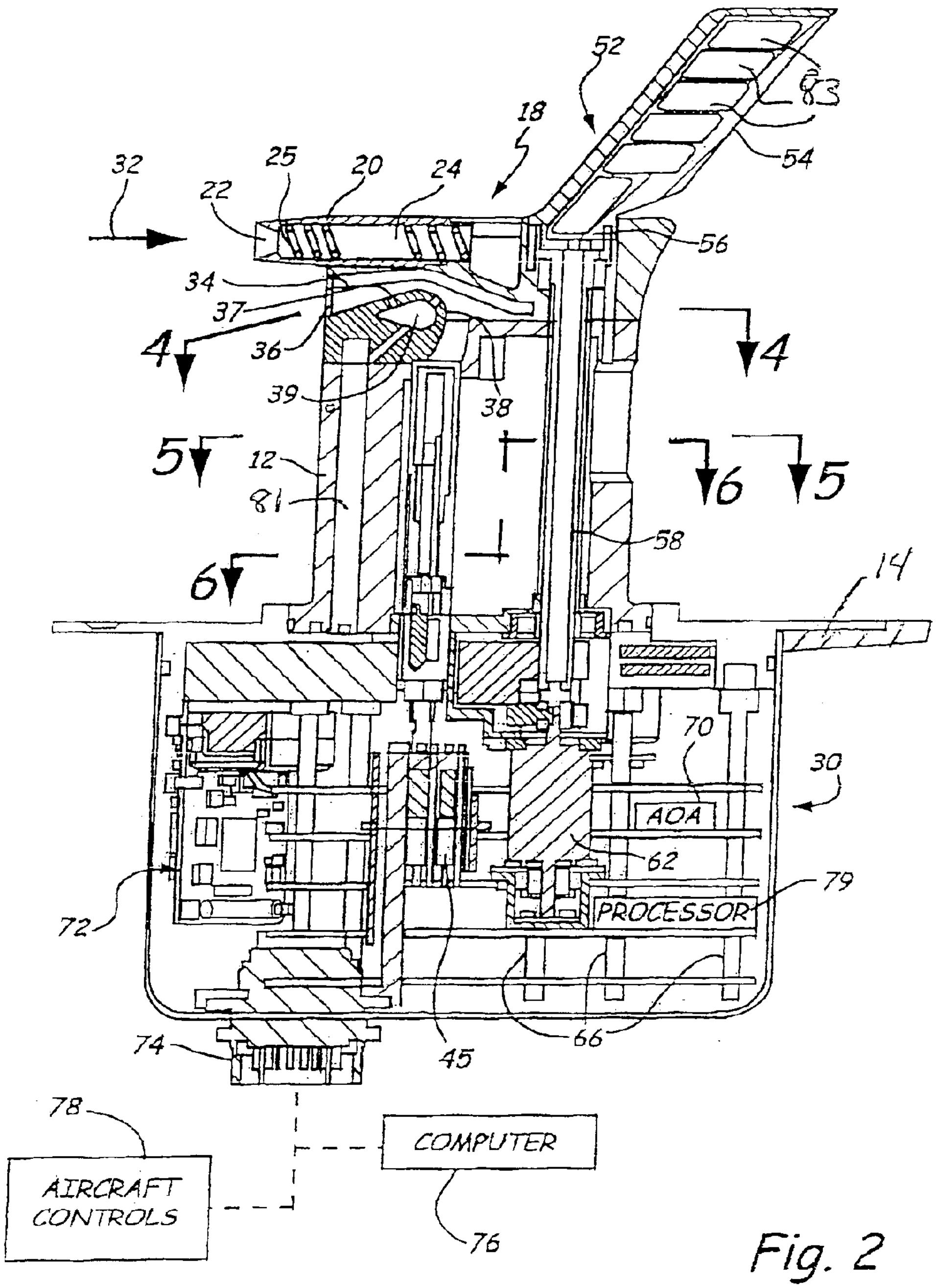
FIG. 2 is a sectional view of the multi-function probe taken along line 2—2 in FIG. 1.
Figure 3:
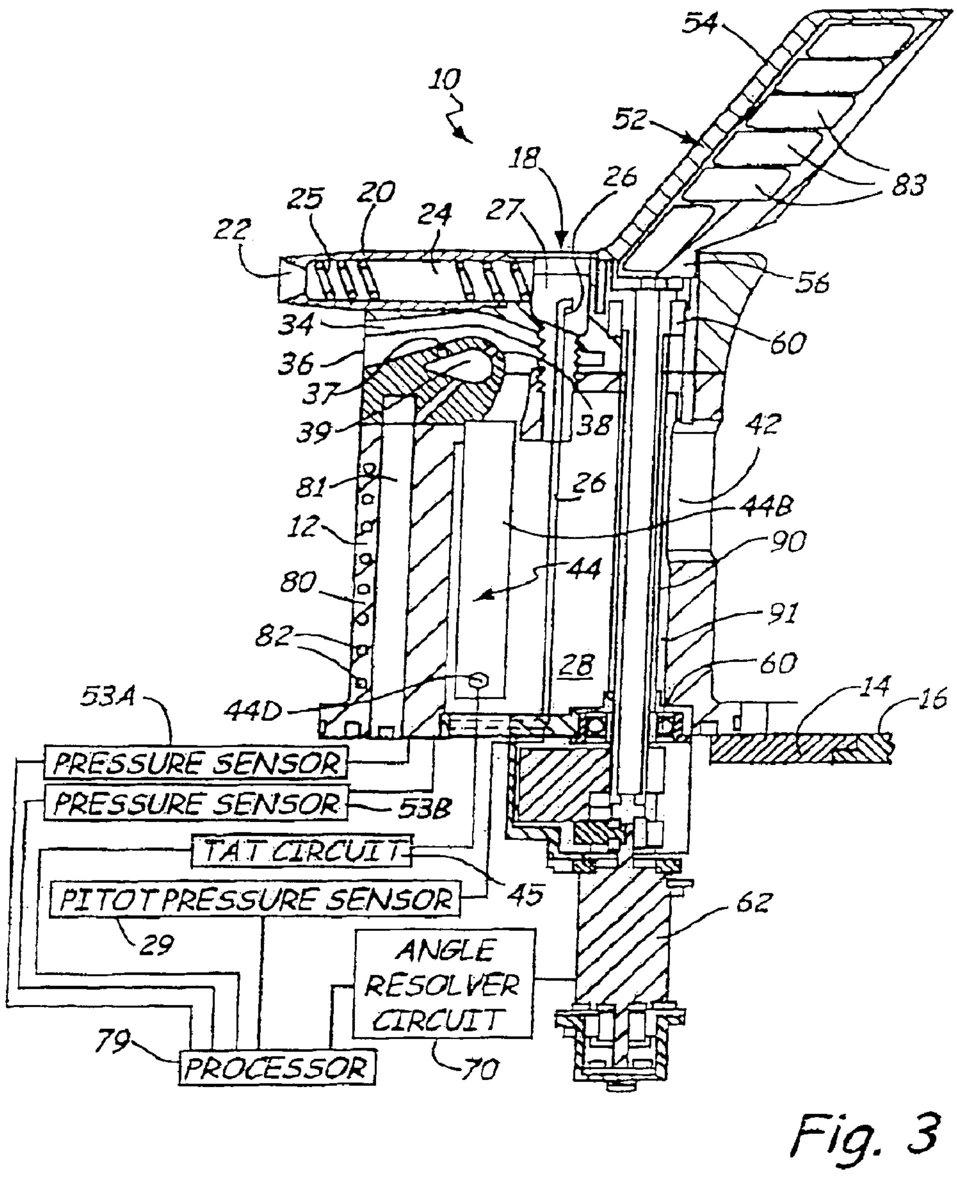
FIG. 3 is an enlarged sectional view of the probe assembly along line 2—2 with parts removed and partially broken away.

The multi-function probe strut 12 supports a multi-function sensing head assembly 18 at its outer end. This head assembly 18 includes a pitot pressure sensing tube 20 which has a forward pitot pressure sensing port 22, and as can be seen in FIGS. 2 and 3, the tube has an interior passageway 24 in which a suitable de-icing heater 25 is mounted.

Figure 1:
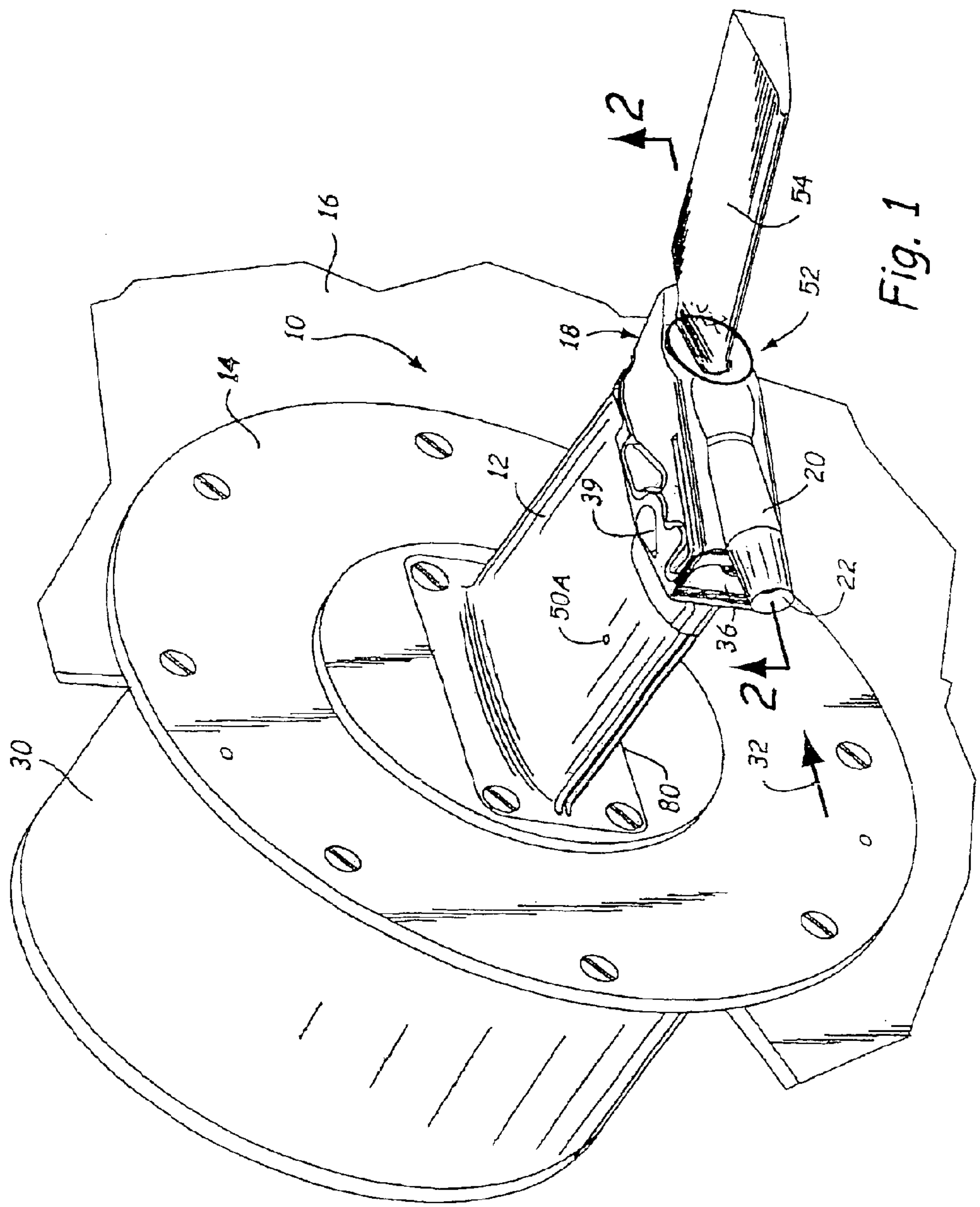
FIG. 1 is a front perspective view of a multi-function probe made according to the present invention in place on a side of an air vehicle.

The base end of the pitot sensing pressure tube is open to a chamber 27, and a tube or line 26 opens to the pitot pressure chamber 27. The tube 26 passes through provided openings and across a chamber 28. The tube 26 is connected to a pitot pressure sensor 29 in an instrument or circuitry package indicated generally at 30 (FIGS. 1 and 2).

The sensor head assembly 18 is supported sufficiently outward from the aircraft skin 16, so it is outside a boundary layer of air on the skin, and is in substantially free stream conditions, insofar as airflow past the probe is concerned. The airflow direction is indicated by arrow 32. The pitot pressure sensing port 22 faces upstream.

Adjacent to and below the pitot pressure sensing tube 22, the sensor head 18 has a duct 34 comprising a total air temperature sensor inlet scoop with a wide inlet scoop opening 36 facing upstream. It can be seen that this inlet scoop opening 36 is positioned outside the boundary layer of air on the aircraft skin.

The duct 34 forms a curved flow path providing inertial separation of large particles from the air stream. The duct 34 is shaped to cause part of the air flow to turn substantially 90 degrees around a rounded surface of a wall portion 38. The wall portion 38 is provided with openings 37 to bleed off the boundary layer air into a cross channel 39 prior to where the flow enters a flow throat 40 that leads to chamber 28 in which a total air temperature sensor 44 is mounted. The boundary layer bleed air passing through openings 37 is discharged laterally through side openings that bleed or exhaust air from cross channel 39, as shown in FIGS. 1 and 2.

The total air temperature sensor 44 is preferably a sealed platinum resistance element in an outer case 44A through which the air from throat 40 flows as shown in FIGS. 4 and 6. The outer case 44A for the total temperature sensor is tubular, as is an outer shield 44B, as shown in FIG. 3. The outer case 44A and outer shield 44B have outlet openings 44C and 44D (see FIG. 6) so the air flowing past the total air temperature discharges into chamber 28 and out a rear port 42, which is at a lower pressure region, such as at the rear of the strut. Any suitable known total air temperature sensor can be used. The temperature sensor 44 is connected to read out circuitry 45 in the instrument package 30.

The curved wall 38, and the flow of part of the air into throat 40, results in inertial separation of larger particles, such as liquid particles, so that part of the air flow, and the larger particles, enter a discharge passageway 41 (FIG. 6) that open to a lower pressure region of the strut through one or more ports 41A. The air that enters passageway 41, as shown, discharges toward the rear and laterally of the sensing head 18. The ports 41A are positioned so the air being discharged does not affect other measurement or sensing functions of the probe.

Static pressure sensing ports 50A and 50B (FIGS. 1 and 5) are provided on the top and bottom walls of the strut 12. The ports 50A and 50B open to passageways 51A and 51B in the strut (FIGS. 5 and 6). The passageways 51A and 51B are connected to separate pressure sensors 53A and 53B in the instrument package 30 (see FIGS. 5 and 6), and static pressure will be sensed as the probe moves with the aircraft through an air stream. Thus, the pressure signal from each port 50A, 50B are individually provided as electrical signals, and the signals can be averaged, as well as subtracted, for calculation of angle of attack, if desired.

In order to provide a direct and primary measurement of angle of attack of an aircraft on which probe 10 is mounted, a vane type angle of attack sensor 52 is provided. The ability to calculate angle of attack from pressure measurements provides redundancy of measurement, and can provide supplemental information.

The sensor 52 includes a vane 54 mounted onto a hub 56, which in turn is attached to a shaft 58. The shaft 58 is mounted in suitable bearings 60, for free rotation about the shaft axis. The inner end of the shaft 58 extends into the instrument package 30 on an interior of the aircraft and is coupled to a conventional angle resolver 62 that senses the rotational movement of the vane 54 about the axis of the shaft 58 to determine changes in the vane angle relative to the strut 12 and aircraft. The changes in vane angle result from changes in the angle of attack of the air vehicle or aircraft 16. The strut 12 is fixed to the aircraft, and the shaft 58 rotates in the strut 12 as the relative angle of attack changes.

The instrument package 30 includes the angle resolver 62 coupled to the shaft 58, and suitable readout circuitry, used on existing angle of attack vanes. This can be any desired type of angle resolver, such as that shown in the prior art, and known in the trade.

The other circuit components making up the instrument package 30 comprise circuit boards of cards mounted on standoff posts 66, that are attached to the strut mounting plate 14. A circuit card that has solid state pressure sensors for sensors 29, 53 and 53B, as well as the angle resolver circuit card 70 for the resolver 62. The pressure sensing condition circuitry can also be mounted on one or more of these circuit cards.

Various other circuit cards can be included, such as those shown at 72 for providing the necessary power supply, heater controls, and communication circuitry. The circuits connect through a single fitting 74 to an onboard computer 76, or, alternatively directly to aircraft controls 78. In addition, a processor 79 for computing and compensating outputs may be provided in the circuit package 30. In such case, processor 79 can replace or supplement the on-board computer 76. The instrument package 30 and probe assembly are removable and replaceable as a unit.

The leading edge 80 of the strut 12 has a suitable de-icing heater, such as a conventional resistant wire heater 82, embedded therein. Because of the mounting of the probe assembly, and the size of the probe assembly, the overall power needed for de-icing the probe is reduced compared with the power needed to de-ice separate pitot, pitot-static and angle of attack probes. A bore 81 in the strut 12 can be used for mounting a cartridge heater, if desired to supplement or replace the wire heater 82. It should be noted that the angle of vane 54 can have solid state de-icing heaters installed therein, such as the positive temperature coefficient heaters 83 shown in FIG. 3.

The leading edge 80 of the strut is shown at substantially a right angle to the skin 16 of the aircraft, but it can be swept rearwardly slightly. The trailing edge also can be inclined, if desired. The shaft 58 has an axis of rotation that is preferably substantially perpendicular to the aircraft skin 16, and preferably perpendicular to the direction of air flow 32.

The angular readout from the resolver 62 used with the vane type angle of attack sensor 52 provides a measurement of local angle of attack, which can be corrected by suitable algorithims, as is well known. Such correction can take place in the memory of processor 79 in instrument package 30, to provide actual angle of attack. Wind tunnel tests can be used for determining the correlation between the local angle of attack as measured, and the actual angle of attack, and provided in a lookup table in the memory of the processor 79 or computer 76, or both.

The angle of attack that is measured by the vane ($AOA_m$) can be corrected to provide the true angle of attack of the probe ($AOA_p$) by providing constants that relate to the configuration of the aircraft and the probe on which the vane is mounted. The general equation is as follows:

$$AOA_p = a(AOA_m) + b \quad (1)$$

a and b are constants derived from wind where a tunnel tests, and b is usually equal or very close to 0.

The measurements of pressures on the multi-function probe disclosed also provides for systematic corrections for pitot pressure ($P_t$); static pressure ($P_s$), and total air temperature (TAT). Equations can be expressed as follows:

$$P_t = (f)\ (P_{tm}/P_{sm}, AOA_p) \quad (2)$$

$$P_s = (f)\ (P_{tm}/P_{sm}, AOA_p) \quad (3)$$

$$TAT = (f)\ (P_{tm}/P_{sm}, AOA_p, TAT_m) \quad (4)$$

f indicates function of:

$P_t$=total pressure $P_{tm}$=measured total pressure $P_s$=local static pressure $P_{sm}$=measured static pressure $AOA_p$=probe angle of attack (in degrees or radians)

TAT=total air temperature $TAT_m$=measured total temperature $AOA_m$=measured probe angle Additionally, angle of attack can be calculated by utilizing the pressures at the ports 51A and 51B, which pressures are individually sensed for providing separate electrical signals. The calculations are carried out in the well known manner that is used where static pressure sensing ports are provided on opposite sides of a cylindrical barrel type probe mounted on a strut. The probe angle is a function of the differential pressures between ports 51A and 51B. Designating the port 51B as $P_1$ and port 51A as $P_2$, the differential pressure is expressed as:

$$dp=p_1-p_2 \tag{5}$$

The angle of attack of the probe is expressed as:

$$dp=(f)\left(\frac{p_{tm}}{p_{sm}},\frac{dp}{q_{cm}}\right) \tag{6}$$

$$p_{sm}=\frac{p_1+p_2}{2} \tag{7}$$

where $q_{cm}=P_{tm}-P_{sm}$

The correction or scaling factors to solve the equations can be provided by lookup tables in the processor 79. The necessary scaling factors can be provided by wind tunnel tests for the particular aircraft construction.

Reference is made to U.S. Pat. No. 6,543,298, which is incorporated by reference, for showing digital corrections for the measured total air temperature.

The multi-function probe includes a total air temperature sensor design that provides accurate total air temperature measurements in a robust probe. The air flow path to chamber 28 provides water and particle droplets separation from the air flowing by the total temperature sensor. The positioning of the temperature sensor in the probe minimizes the de-icing power required, and this minimizes the heating error that may be introduced to total air temperature sensors. The location of the scoop inlet opening for the total air temperature sensor, and the design of the flow passage, insures accurate performance.

The probe assembly 10 is a stand alone probe design, and is easier to service and replace. The pitot tube is maintained in a known position relative to the air stream past the air craft, and it has the ability to accurately measure the pitot pressure.

The incorporation of a vane angle of attack sensor as part of the multi-function probe avoids possible port clogging problems that can occur where only pneumatic signals are used for calculating angle of attack, and provides for high reliability. Angle change dynamic response is also high since the vane is positioned at the outer end of the strut, outside of boundary layer air and other influences caused by the aircraft surface.

The shaft 58 for the angle of attack sensing vane 54 passes through a bore 90 (FIG. 3) that is larger in diameter than the shaft. This bore can be filled with a suitable damping fluid 91, such as a viscous oil, if desired. The viscous material will dampen flutter or oscillations of the vane.

The pitot tube 20 remains oriented in a fixed position on the strut. The vane 54 can move without affecting the position of the pitot tube.

Although the present invention has been described with reference to preferred embodiments, workers skilled in the art will recognize that changes may be made in form and detail without departing from the spirit and scope of the invention.

What is claimed is:

1. A multi-function air data sensor probe for sensing a plurality of air data parameters comprising a strut that extends from the skin of an aircraft, a pitot pressure sensing port at an outer end of said strut, a total air temperature sensor in said strut, at least one static pressure sensing port on said strut, and a rotatably mounted angle of attack sensing vane mounted on the strut for rotation about an axis generally perpendicular to the skin of the aircraft on which the strut is mounted, and extending outwardly from an outer end of said strut, the vane moving about the axis to indicate relative air flow direction past the strut.

2. The multi-function air data sensor of claim 1, wherein said static pressure sensing port is positioned on a lateral side of the strut, and is in fluid communication with a passageway on the interior of the strut, and includes a pressure sensor in fluid communication with the passageway for measuring the pressure in the passageway.

3. The multi-function air data sensor of claim 1, wherein the strut has a base end for mounting on an aircraft, and a self-contained instrumentation package mounted at the base end for installation as a unit with the strut onto an aircraft with the instrument package on an interior of such aircraft.

4. The multi-function air data sensor of claim 1, wherein the strut has a base end that mounts on the skin of an aircraft, the sensing vane being mounted on a shaft supported on the strut with the shaft rotation about the axis, and an angle resolver connected to the shaft for determining changes in angle of the shaft as air flow past the strut changes the relative position of the sensing vane.

5. The air data sensor of claim 1, wherein the strut has a flow duct, the total air temperature sensor being mounted to be in fluid communication with the flow duct, an inlet to the flow duct comprising a forwardly facing air scoop, a wall surface defining portions of the scoop and flow duct and over which the air flows, and a plurality of openings in the wall surface to remove boundary layer air as the flow passes into the flow duct.

6. The multi-function air data sensor of claim 1, wherein said strut has a generally airfoil shape cross-section.

7. The multi-function air data sensor of claim 1, further comprising heaters mounted in the strut along at a least a leading edge thereof that faces an upstream direction relative to the airflow.

8. The multi-function air data sensor of claim 1, wherein the strut has upper and lower lateral sides, the at least one static sensing port comprising a first static pressure sensing port on the upper lateral side of the strut, and a second static sensing port on the lower lateral side of the strut, and a separate pressure sensor coupled to the respective first and second static sensing ports.

9. A multi-function air data sensing probe comprising a strut having a base end mountable to an aircraft to extend laterally outwardly therefrom, an angle of attack sensor vane mounted on said strut and positioned at an outer end thereof and extending outwardly therefrom, said vane being pivotable about an axis generally perpendicular to a surface of an aircraft on which the strut is mounted, a sensor to sense an angular position of the vane relative to a reference, an outer end of the said strut having a pitot port facing upstream relative to air flow past the strut, a forwardly facing total temperature sensor inlet scoop formed on the strut, and spaced from the pitot port, said scoop leading to a flow passageway that changes direction to direct flow into a first chamber, a total air temperature sensor in said first chamber, said first chamber having exhaust openings therefrom for permitting air to flow through said chamber, separate static pressure ports on each of the lateral sides of the said strut, and pressure sensors connected to separately sense pressures at the pitot port and the static pressure ports.

10. The multi-function air data sensing probe of claim 9, wherein said inlet scoop directs flow over a surface of a wall having a plurality of openings therethrough for bleeding boundary layer air through the openings to remove said boundary layer air prior to the flow entering the first chamber.

11. The multi-function air data sensing probe of claim 10, wherein said openings in said wall lead to a cross channel exhausting boundary layer air laterally of the strut.

12. The multi-function air data sensing probe of claim 9, wherein said pitot port is at an end of a tube, said tube being mounted on an outer end of said strut and extending upstream beyond the inlet scoop for the total temperature sensor.

13. The multi-function air data sensing probe of claim 9, wherein said strut has a generally airfoil shape cross section.

14. The multi-function air data sensing probe of claim 9, wherein the static pressure sensing ports extend to separate static pressure passageways, and further comprising a separate pressure sensor for sensing the pressure from each of the static pressure sensing ports and providing separate pressure signals, the pressure signals being provided to a processor for calculating angle of attack based upon differential pressures sensed at the static pressure sensing ports.

15. The multi-function air data sensing probe of claim 9, further comprising a processor including lookup tables for compensation of measured angle of attack, pitot pressure, and static pressure to provide corrected angle of attack and pressure signals.

16. The multi-function air data sensing probe of claim 15, wherein the processor is mounted in an instrument housing directly to a mounting plate for the probe.

* * * * *